Feb. 4, 1964 S. T. ECHOLS, JR 3,120,169
CORN POPPER
Filed July 31, 1961 3 Sheets-Sheet 1
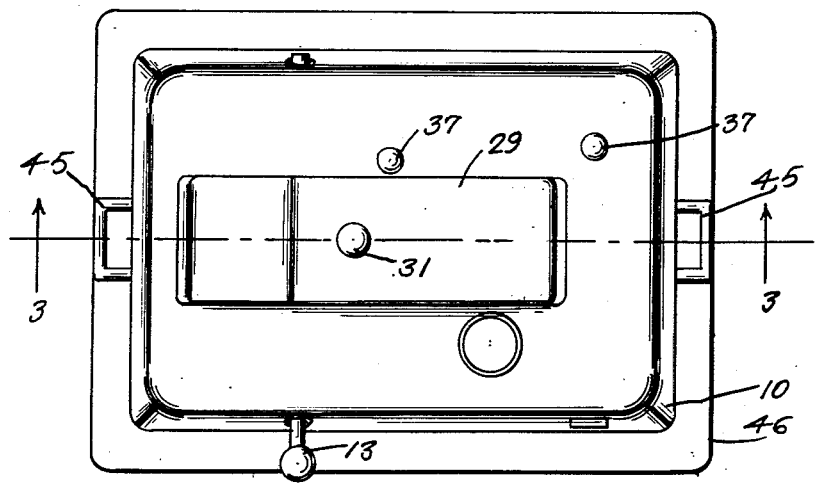
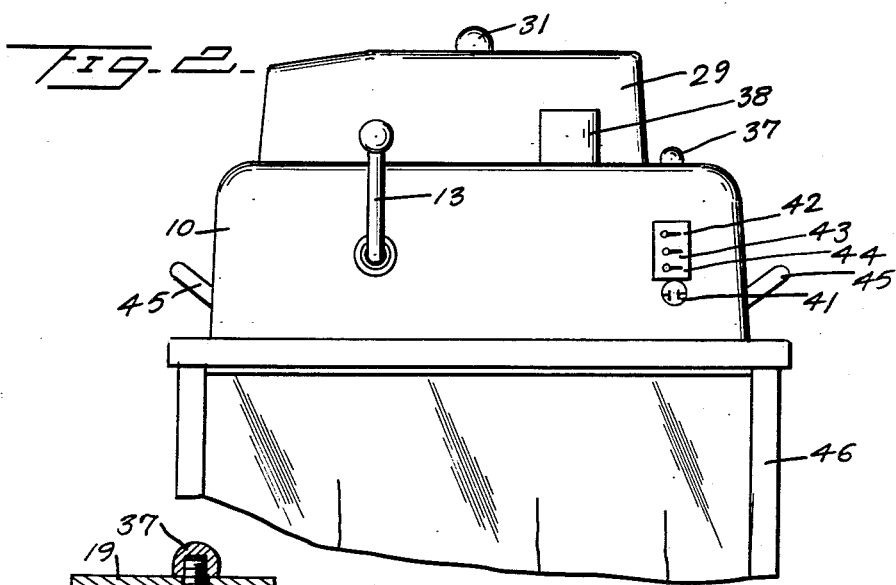
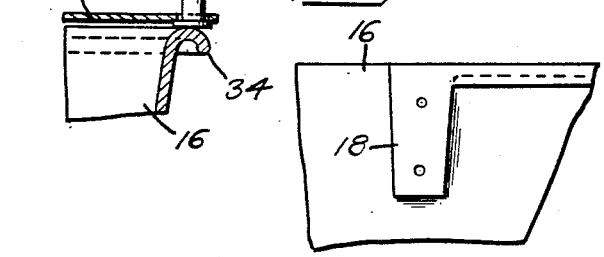
S. T. Echols, Jr.
INVENTOR
BY C. A. Snow & Co.
ATTORNEYS.

Feb. 4, 1964
S. T. ECHOLS, JR
3,120,169
CORN POPPER
Filed July 31, 1961
3 Sheets-Sheet 2
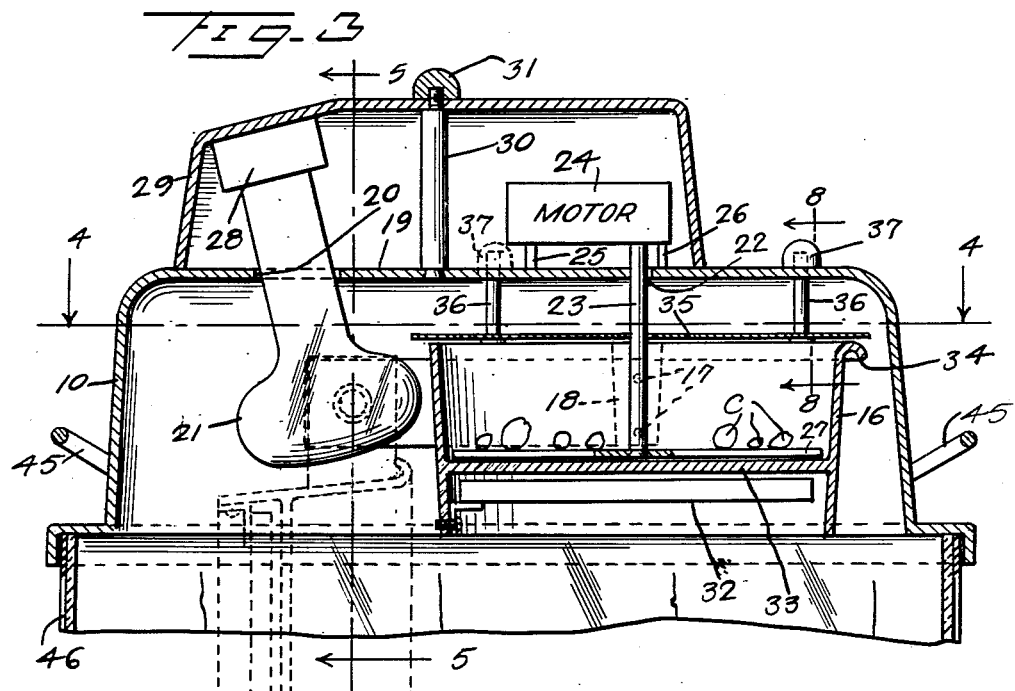
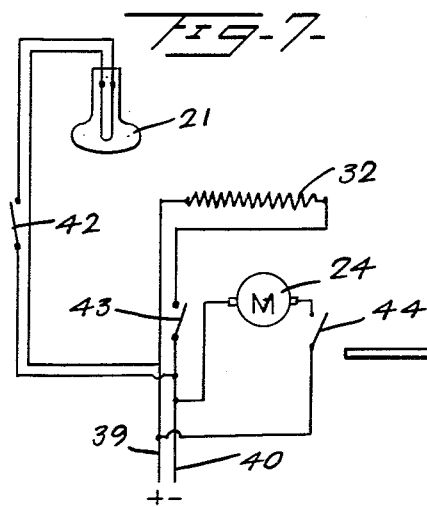
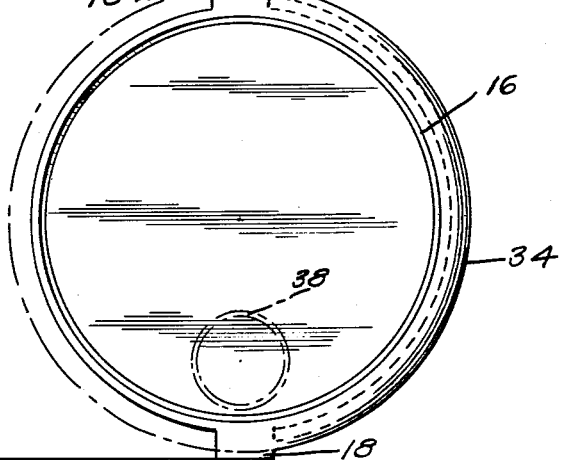
S.T.Echols, Jr.
INVENTOR
BY
ATTORNEYS.

Feb. 4, 1964   S. T. ECHOLS, JR   3,120,169
CORN POPPER
Filed July 31, 1961   3 Sheets-Sheet 3
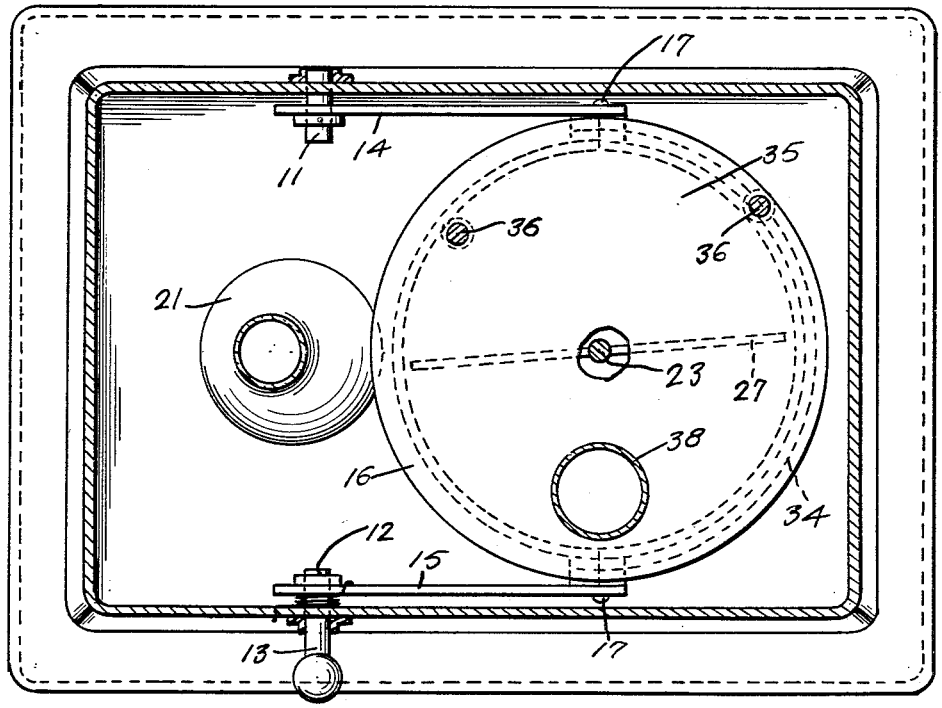
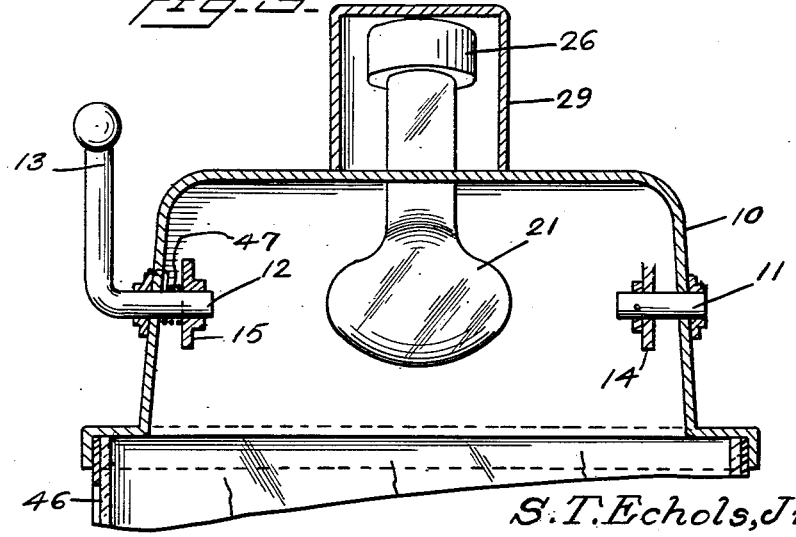
S. T. Echols, Jr. INVENTOR
BY *C. A. Snow & Co.*
ATTORNEYS.

3,120,169
CORN POPPER
Samuel T. Echols, Jr., Bismarck, Mo.
Filed July 31, 1961, Ser. No. 129,202
5 Claims. (Cl. 99—238.5)

This invention relates to a light weight portable corn popper, having provisions for loading and unloading in such a manner that the operator will not come into contact with hot or moving parts of the corn popper. This application is a continuation-in-part of my application Serial No. 777,478 filed December 1, 1958, which application is abandoned.

An object of the invention is to provide a kettle of an improved design, that eliminates latches, catches and other projections.

Still another object of the invention is to provide a compact corn popping device which is portable and is adapted to be moved from one receptacle to another.

A further object of this invention is to provide a heat lamp to keep the corn warm after it has been popped and dropped into a receptacle ready for dispensing.

Still another object of this invention is to provide a gravity held and operated kettle lid that does not require manual operation when the invention is in use.

Another object of the invention is to provide a corn popping device having a kettle movable by means of an external lever from a horizontal operating position to a second dumping position.

Still another object of the invention is to provide a corn popping kettle which may be moved from one movably fixed operating position to a second movably fixed dumping position by means of an external lever.

Still another and further objects and advantages of this invention will become apparent upon a full understanding of the invention as hereinafter described and shown in the drawings and defined in the appended claims.

Referring to the drawings:

FIGURE 1 is a plan view of one embodiment of this invention.

FIG. 2 is a side elevational view of FIG. 1.

FIG. 3 is a sectional view taken substantially along line 3—3 of FIG. 1, as viewed in the direction indicated by the arrows.

FIG. 4 is a sectional view taken substantially along line 4—4 of FIG. 3 as viewed in the direction indicated by the arrows.

FIG. 5 is a sectional view taken substantially along line 5—5 of FIG. 3 as viewed in the direction indicated by the arrows.

FIG. 6 is a plan view of the kettle and supporting arms.

FIG. 7 is a wiring diagram for the electric heat lamp and kettle heating coil and stirring motor.

FIG. 8 is a sectional view taken substantially along line 8—8 of FIG. 3 as viewed in the direction indicated by the arrows.

FIG. 9 is a fragmentary detail side elevational view showing screw holes for attaching the kettle supporting arm to the kettle.

Similar reference characters refer to similar parts throughout the several views of the drawings.

Having reference now to the drawings in detail, there is generally indicated by the character 10 the compact body of the corn popper, whose lower extremities are of such shape as to make it possible to sit on any suitable open top container, or on top of the conventional electric ice shaver case.

Passing through each side of body 10 there are arms-holding rods 11 and 12, rod 12 being bent upward on the outside of body 10 so as to form a kettle tipping lever 13.

It will be clearly seen on examination of FIG. 4 of the appended drawings that arm holding rods 11 and 12 pass through arms 14 and 15 which in turn support kettle 16 by means of screws 17 which are threaded in openings formed in laterally extended lugs 18 forming a part of said kettle 16.

Referring to FIG. 3 it will be seen that the top portion 19 of body 10 of this device contains an opening 20 for the pop corn heating lamp 21 and another opening 22 for stirring support rod 23. The said rod 23 has attached to its upper end, electric stirring motor 24 which is supported by and attached to the top portion 19 of body 10 by means of brackets 25 and 26. The stirring rod 23 has attached to its lower end stirrer 27.

The heating lamp 21 is screwed into socket 28 that is attached to the underside of cover 29 that sits on the top portion 19 of the body 10. This said cover 29 is held in place by means of shoulder screw 30 and nut 31. It is noted from examination of FIG. 3 that cover 29 also provides a cover for the stirring motor 24.

The kettle 16 contains a pop corn heating element 32 located under its bottom 33 and out of direct contact with the corn that is to be popped.

There is also a lip 34, the purpose of which will be fully described in the operation of this invention. A lid 35 covers the top of, but not necessarily rests on top of kettle 16. This lid is held in place, and attached to the top portion 19 of body 10 by means of lid bolts 36 and nuts 37. The lid contains kettle filling spout 38 that protrudes upward through the top portion 19 of body 10 of the device.

Referring to FIG. 7 it will be seen that warming lamp 21, electric motor 24 and kettle heating element 31 all receive electricity through wires 39 and 40, which terminate at socket 41 located on body 10, as shown by FIG. 2.

The electric heating lamp 21 is controlled by switch 42, while current to kettle heating element 32 is controlled by switch 43, the current to the stirring motor 24 being controlled by a switch 44.

It will be noted that the body 10 of this invention has handles 45 so that it may be readily removed from container 46 or any other object on which it may rest.

In operation of this apparatus a charge of corn C, oil and salt, is dumped into the kettle 16 through filling spout 38 and it falls on the bottom 33 of said kettle 16.

Electric switch 43 is then turned on so that the heating element 32 may supply the necessary heat for popping the corn, at the same time stirring motor 24 is started by means of electric switch 44. The motor 24 rotates stirrer 27 by means of rod 23, thus agitating the corn, preventing it from sticking to the bottom of the kettle and burning.

As the corn begins to pop the kettle is then filled and the popped corn will exert a slight pressure on the kettle lid which will move upward and yet be kept in a horizontal spaced relation from and over the kettle by bolts 36. This upward movement of the kettle lid is clearly shown by dotted lines in FIG. 8 of the drawings.

As the kettle lid floats upwardly the popped corn will fall out into the receptacle on which the body 10 of the device may be resting.

After all the corn has been popped it is necessary to dump kettle 16 by means of turning handle 13 in a clockwise direction. Thus rotating handle 13 will cause kettle 16 to swing downward since it is attached to holding rods 11 and 12, on which it will rotate by arms 14 and 15. This dumping of the kettle is shown very clearly in FIG. 3. Spring 47 on rod 12 will bring kettle 16 back into place again after dumping the popped corn.

The warming lamp 21 projecting hot rays downwardly into the container 46 on which the device rests, will maintain the popped corn warm until it is dispensed.

It is to be noted that the kettle lip 34 is so formed that any oil or grease reaching the said lip will either flow back into the kettle or else drop off into the container 46 and thus will not flow over the outside of said kettle, which would create an objectional condition.

From the foregoing it will now be seen that there is herein provided an improved corn popper, which accomplishes all of the objects of this invention, and others, including many advantage of great practical utility and commercial importance.

As many embodiments may be made of this inventive concept, and as many modifications may be made in the embodiment hereinbefore shown and described, it is to be understood that all matter herein is to be interpreted merely as illustrating and not in a limiting sense.

Having thus described the invention, what I claim is:

1. A corn popper of the character described, comprising a body rectangular in cross section having a top with four sides, a cylindrical corn popper kettle mounted within said body, means maintaining said kettle for movement in a non-dispensing position, arms disposed in said body secured to said kettle, said arms being pivotally mounted on the sides of said body, a kettle tipping lever extending into said body secured to one of said arms for manually effecting dumping of said kettle, a stirrer within said kettle, an electric motor mounted on the top of said body for effecting rotary movement of said stirrer, a floating lid resting on said top of said kettle normally closing the kettle, vertical bolts having one of their respective ends secured to said top side and their opposite ends slidably receiving said lid to permit upward movement thereof, a filling spout supported by said top side and extending through it and said floating lid into said kettle, an electric heating element mounted under the bottom of said kettle, a popcorn storage container below said body for dumping popcorn therein, other heating means disposed in said body for keeping popcorn in said container heated, and casing means enclosing a portion of said other heating means and said electric motor.

2. A corn popping device comprising end and side walls, a top wall and an open bottom wall, outwardly disposed ledges on the bottom of said end and side walls, adapted for mounting the device on a popcorn receiving device, heating means and an electrical stirring means mounted on and through said top wall and a kettle receiving said stirring means and hingedly connected from said side walls for swinging movement in an arc whereby said kettle is totally enclosed in said device at one horizontal operating position and is depending therefrom at a dumping position.

3. A light weight, portable, corn popping device comprising a body member having end, side and top walls, a corn popping kettle pivotally mounted within said side walls, an external kettle tipping lever connected therewith to manually pivot said kettle for swinging movement in an arc from one horizontal operating position enclosed in said body member to a dumping position depending from said body member, a stirrer rotably mounted through said top wall and received within the kettle in the horizontal position thereof and an electric motor mounted on said top for effecting rotary movement to said stirrer, a movable lid for said kettle spaced from said top wall about said stirrer, and a filling spout mounted through said top wall and movable lid.

4. A light weight, portable, corn popping device comprising end and side walls, a top wall and an open bottom wall, ledges on said end and side walls, adapted for mounting the device on a pop corn receiving device, heating means and an electrical stirring means mounted on said top wall and a kettle having a heating means hingedly connected from said side walls for swinging movement in an arc, whereby said kettle is totally enclosed in said device at one horizontal operating position and is depending therefrom at a dumping position, into a popcorn receiving device.

5. A safe, light weight, portable, corn popping device comprising a body member having end, side and top walls, a corn popping kettle pivotally mounted within said side walls, an external kettle tipping lever connected therewith to manually pivot said kettle for swinging movement in an arc from one horizontal operating position enclosed in said body member to a dumping position depending from said body member and into a receptacle for cooked popcorn, a stirrer rotably mounted through said top wall and received within the kettle in the horizontal position thereof and an electric motor mounted on said top wall for effecting rotary movement to said stirrer, an upwardly movable lid for said kettle spaced from said top wall about said stirrer, and a filling spout mounted through said top wall and movable lid.

References Cited in the file of this patent

UNITED STATES PATENTS

| | | |
|---|---|---|
| 1,501,114 | Howe | July 15, 1924 |
| 2,027,698 | Parks et al. | Jan. 14, 1936 |
| 2,367,260 | Beddoes | Jan. 16, 1945 |
| 2,549,449 | Gibson | Apr. 17, 1951 |
| 2,586,923 | Dondaville | Feb. 26, 1952 |
| 2,604,030 | Cretors | July 22, 1952 |
| 2,630,058 | Hawks | Mar. 3, 1953 |
| 2,713,302 | Crank | July 19, 1955 |